United States Patent [19]

Iwasaki et al.

[11] Patent Number: 4,790,638
[45] Date of Patent: Dec. 13, 1988

[54] LENS SYSTEM FOR PROJECTING IMAGES OF MICROFILM

[75] Inventors: Satoshi Iwasaki; Toshihiko Ueda, both of Toyokawa; Kunihiko Konoma, Aichi, all of Japan

[73] Assignee: Minolta Camera Kabushiki Kaisha, Osaka, Japan

[21] Appl. No.: 913,078

[22] Filed: Sep. 29, 1986

[30] Foreign Application Priority Data

Sep. 30, 1985 [JP] Japan .................. 60-218491

[51] Int. Cl.⁴ .............................................. G02B 9/60
[52] U.S. Cl. ................................................. 350/465
[58] Field of Search ................................ 350/463–465

[56] References Cited

U.S. PATENT DOCUMENTS 3,698,796 10/1972 Bertele ........................ 350/465
3,907,418 9/1975 Okuyama ..................... 353/77

FOREIGN PATENT DOCUMENTS

47-35028 9/1972 Japan .

Primary Examiner—John K. Corbin
Assistant Examiner—Scott J. Sugarman
Attorney, Agent, or Firm—Price, Gess & Ubell

[57] ABSTRACT

There is disclosed a lens system for projecting images of microfilm onto a screen or the like. The lens system is characterized by five lens components, that is, a first positive meniscus lens component convex to the magnification side, a second negative meniscus lens component concave to the magnification side, a third biconvex lens component, a fourth biconcave lens component having a powerful concave surface faced to the magnification side, and a fifth biconvex lens component.

17 Claims, 4 Drawing Sheets

FNo./5.6
spherical aberration

Fig. 6b

ω = 15.0°
astigmatism

Fig. 6c

ω = 15.0°
distortion

Fig. 7a

FNo./4
spherical aberration

Fig. 7b

ω = 15.0°
astigmatism

Fig. 7c

ω = 15.0°
distortion

Fig. 8a spherical aberration

Fig. 8b astigmatism

Fig. 8c distortion

Fig. 9a spherical aberration

Fig. 9b astigmatism

Fig. 9c distortion

LENS SYSTEM FOR PROJECTING IMAGES OF MICROFILM

BACKGROUND OF THE INVENTION

The present invention relates to a lens system for projecting an image of microfilm handled in readers or reader-printers.

The frames on a microfilm are in a vertical or horizontal position relative to the film, while information is recorded in the frame in a vertical or horizontal position relative to the frame. If images on the microfilm are projected with the film in a definite position, it is likely that the image will be projected in an inappropriate orientation. For example, information projected as oriented horizontally in reader mode is almost impossible to read. Further if the orientation in which the frame is projected is not in coincidence with the orientation of copy paper in a printer mode, an incomplete copy will be obtained. These objections can be eliminated by rotating the microfilm itself, but the device for holding the film must then be rotated. This requires a complex arrangement.

U.S. Pat. No. 3,907,418 discloses an arrangement wherein the film image to be projected is rotated on a plane of projection by a prism. The prism employed is a trapezoidal prism, i.e., Dove prism, and is disposed at the light emergent side of a projection lens rotatably about the optical axis of the lens. The rotation of the prism rotates the image through twice the angle of rotation thereof.

Such projection system with the image rotation prism becomes larger in size. Especially, a use of a lens system having an aperture stop at a center position of the lens system or close thereto causes the size of the prism to become much larger because the length crossing the field angle of the lens system becomes larger. In order to solve the drawback mentioned above, Japanese patent publication No. 47-35028 discloses a use of a lens system having an aperture stop provided between the lens and the prism, that is, at the front end of the lens system.

However, it is difficult in general for the front stop type lens systems to compensate for the aberration in the off axial region, and also to compromise with various other aberrations into an adequate performance as a whole because of a limited combination of glass materials for compensating for both longitudinal and lateral chromatic aberration. As apparent from the disclosure of the above mentioned prior art, the lens system thereof has a narrower field angle (about 20°), which results in large-sized projection system.

SUMMARY OF THE INVENTION

Accordingly, an object of the present invention is to provide an improved lens system for projecting images of microfilm.

Another object of the present invention is to provide a lens system having a wide field angle.

Still another object of the present invention is to provide a lens system with well balanced compensation of each aberration.

Still another object of the present invention is to provide a lens system which can be used in a compact-sized projection system even if the projection system has the image rotation prism.

According to the present invention, a lens system comprises from the magnification side to the reduction side, a first lens component of a positive meniscus lens component convex to the magnification side, a second lens component of a negative meniscus lens component concave to the magnification side, a third lens component of a biconvex lens component, a fourth lens component of a biconcave lens component having a powerful concave surface faced to the magnification side, and a fifth lens component of a biconvex lens component.

More specifically, the lens system of the present invention fulfills the following conditions:

$$0.9 \leq TL/f \leq 1.1$$

$$0.6 \leq \epsilon d/f \leq 0.7$$

wherein,
f represents a total focal length,
$\epsilon d$ represents a length of an optical axis from the frontmost lens surface to the rearmost lens surface of the lens system, and
TL represents the sum of $\epsilon d$ described above with a lens back focal length positioned at an infinite focussing condition.

More specifically, the lens system of the present invention fulfills the following conditions:

$$-3.1 \leq \frac{f}{f_1} + \frac{f}{f_4} \leq -2.5$$

$$25 \leq \frac{\nu_1 + \nu_3}{2} - \frac{\nu_2 + \nu_4}{2} \leq 30$$

wherein,
$f_1$ and $f_4$ represent focal lengths of the first and fourth lens components respectively, and
$\nu_1$, $\nu_2$, $\nu_3$ and $\nu_4$ represent the Abbe numbers of the first, second, third and fourth lens components respectively.

More specifically, the lens system of the present invention has an aperture stop at a position on the forward or magnification side of the third lens component.

It should be noted that the lens system of the present invention can be used in a projection system without the image rotation prism. When the lens system of the present invention is used in the projection system with the image rotation prism, the aperture stop is suitably positioned at a position on the forward side of the third component, most adequately at the frontmost side thereof. On the contrary, when the lens system of the present invention is used in a projection system without an image rotation prism, the aperture stop may be positioned at any position between the frontmost side and the center of the lens system.

The features of the present invention which are believed to be novel are set forth with particularity in the appended claims. The present invention, both as to its organization and manner of operator, together with further objects and advantages thereof, may best be understood by reference to the following description, taken in conjunction with the accompanying drawings.

DETAILED DESCRIPTION OF THE PREFERRED EMBODIMENTS

The following description is provided to enable any person skilled in the optical field to make and use the invention and sets forth the best modes contemplated by the inventor for carrying out their invention. Various modifications, however, will remain readily apparent to those skilled in the art, since the generic principles of the present invention have been defined herein specifically to provide a relatively economical and easily manufactured compact lens system. The derivation of the formulas and the relation of the powers set forth herein can be accomplished with the assistance of a computer. The present invention represents the parameters of a compromise balance of acceptable aberrations which can be relatively easily manufactured to provide a lens system for projecting the images on microfilm.

In the drawing, schematic cross sectional views disclose the position of the lens components or lens elements with annexed numbers respectively. Due to the number of lens elements involved, it was deemed appropriate to include individual designation of the radii of curvature and axial distances for each lens element and air space. These values, however, are provided in the accompanying tables set forth herein, and the schematic cross sectional views of the respective embodiments follow the normal conventions of the image plane at the left-hand side of the drawing and the object plane at the right-hand side.

Figure 1:
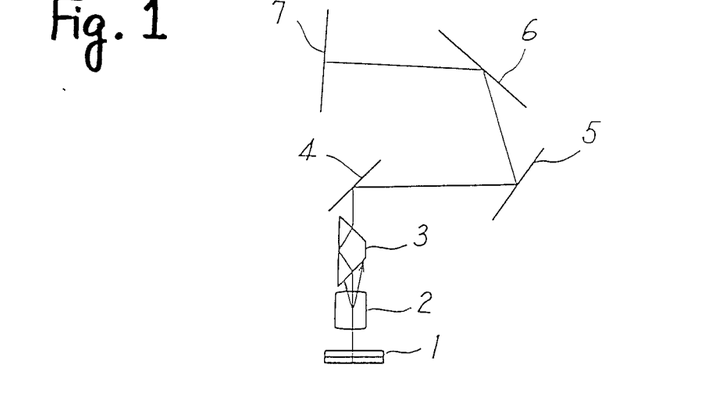
FIG. 1 represents a schematic view for showing the projection system with the image rotation prism in which the lens system of the present invention may be used.

First of all, one example of the projection system for projecting images of microfilm will be explained by reference with FIG. 1. The microfilm 1 is held between two glass plates G and G' which are movable forward or rearward and leftward or rightward so as to position the desired frame at a projection position. The microfilm 1 thus held is illuminated by a lamp (not shown). A light image of the microfilm 1 is projected to a screen 7 through a projection lens system 2, an image rotation prism 3 and mirrors 4, 5 and 6. The image rotation prism 3 is rotated by an unillustrated mechanism in accordance with the orientation of the image.

Figure 2:
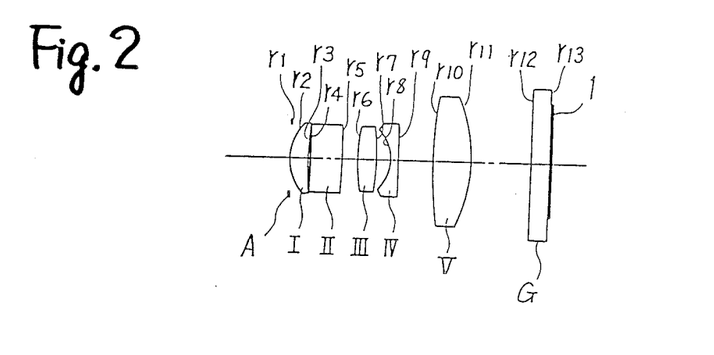
FIG. 2 represents a cross sectional view of the lens system according to first, second, third, fourth and fifth embodiments of the present invention.

FIG. 2 shows a schematic structure of the projection lens system which corresponds to the first to fifth embodiments. From the left hand side of FIG. 2, there is provided, in order, an aperture stop A, a first lens component I which comprises a positive meniscus lens component convex to the magnification side, a second lens component II which comprises a negative meniscus lens component concave to the magnification side, a third lens component III which comprises a biconvex lens component, a fourth lens component IV which comprises a biconcave lens component having a powerful concave surface faced to the magnification side, a fifth lens component V which comprises a biconvex component, and a glass plate G which holds the microfilm in cooperation with another glass plate G'.

Figure 3:
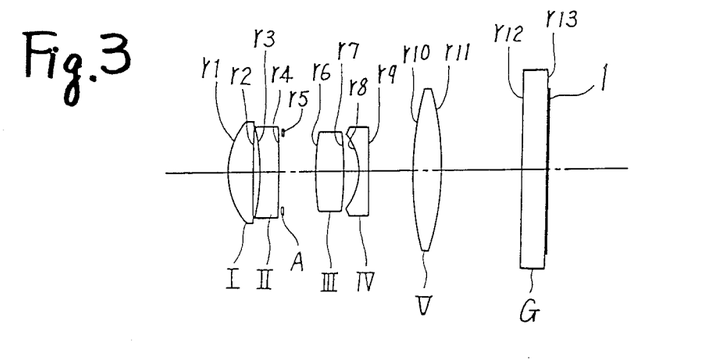
FIG. 3 represents a cross sectional view of the lens system according to a sixth embodiment of the present invention.
Figure 4A:
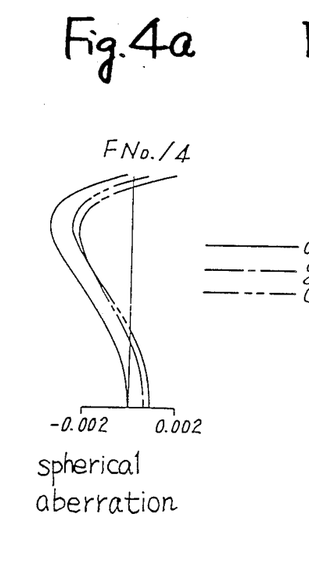
FIGS. 4a to 4c represent the aberration curves of the first embodiment.
Figure 4B:
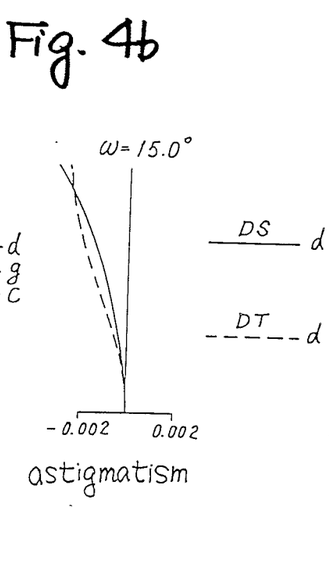
Figure 4C:
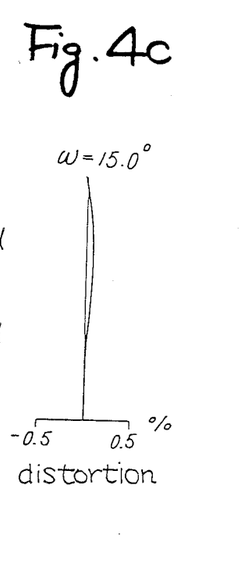
Figure 5A:
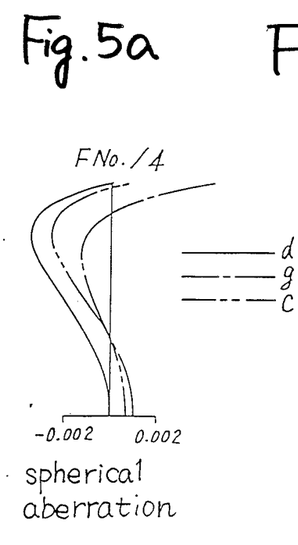
FIGS. 5a to 5c represent the aberration curves of the second embodiment.
Figure 5B:
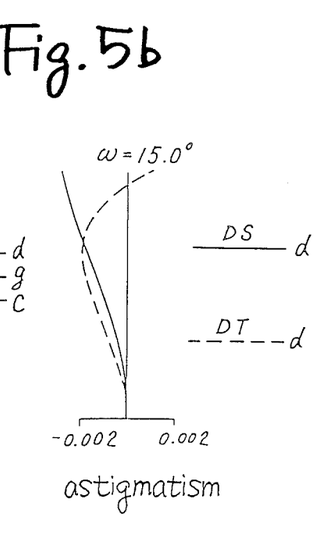
Figure 5C:
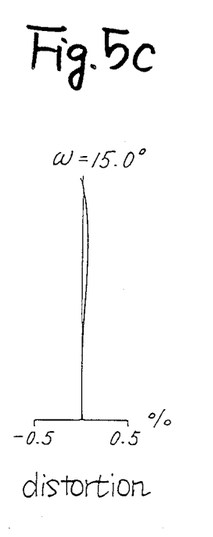
Figure 6A:
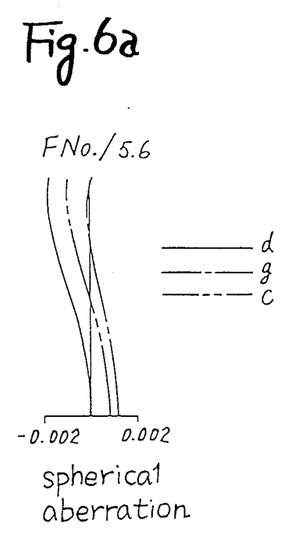
FIGS. 6a to 6c represent the aberration curves of the third embodiment.
Figure 6B:
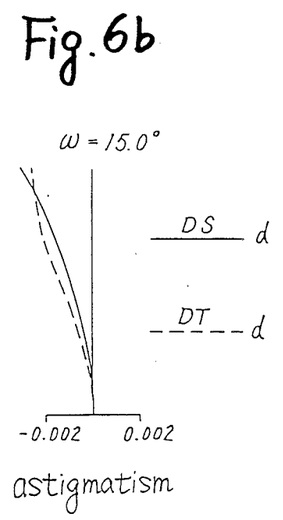
Figure 6C:
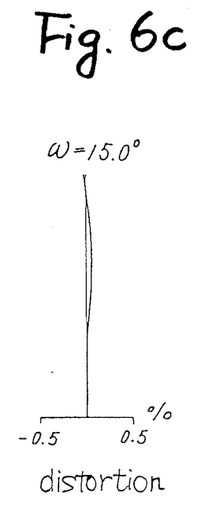
Figure 7A:
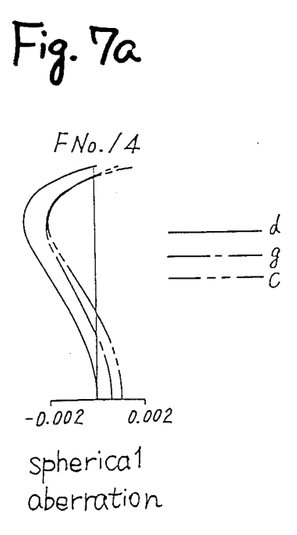
FIGS. 7a to 7c represent the aberration curves of the fourth embodiment.
Figure 7B:
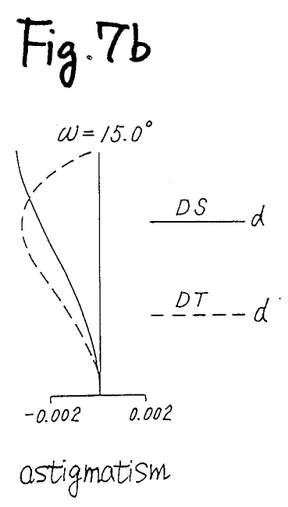
Figure 7C:
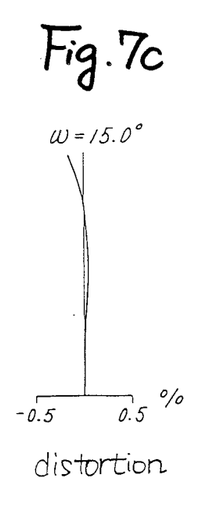
Figure 8A:
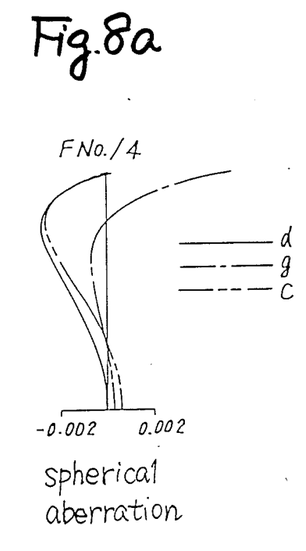
FIGS. 8a to 8c represent the aberration curves of the fifth embodiment.
Figure 8B:
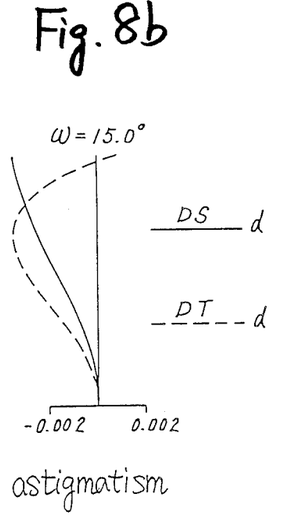
Figure 8C:
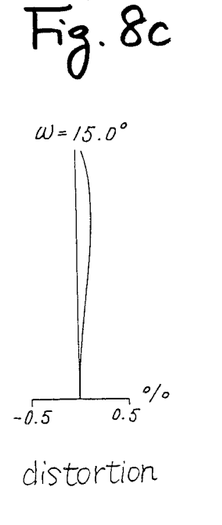
Figure 9A:
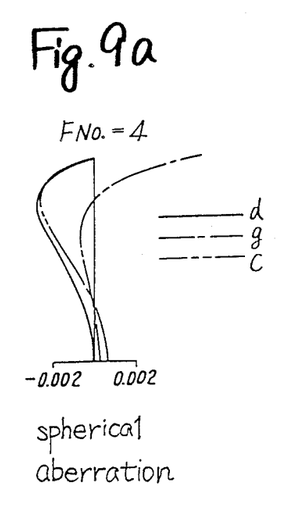
FIGS. 9a to 9c represent the aberration curves of the sixth embodiment.
Figure 9B:
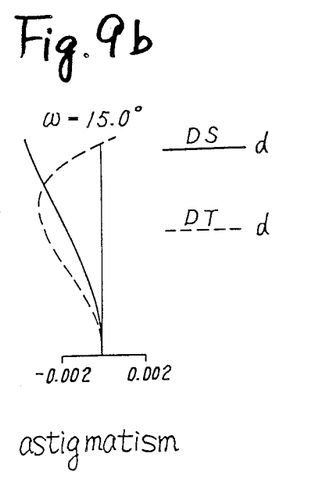
Figure 9C:
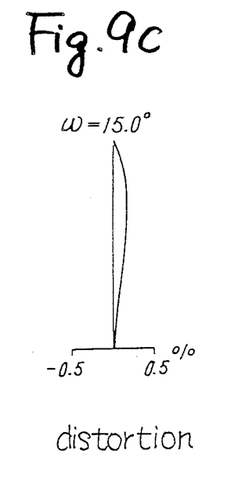

FIG. 3 shows a schematic structure of the projection lens system corresponding to the sixth embodiment. The sixth embodiment differs only by the position of the aperture stop A. Namely, the aperture stop A of the sixth embodiment is positioned at the rear side of the second lens component.

The lens system of the present invention is characterized in that a spherical aberration produced by the first lens component is compensated by the second and fourth lens components, that a negative Petzval sum produced by the fourth lens component is compensated by the third and fifth lens components and that a comatic aberration produced by the first lens component is compensated by the fourth lens component.

Further, the lens system of the embodiments fulfill the following conditions:

$$0.9 \leq TL/f \leq 1.1 \tag{1}$$
$$0.6 \leq \Sigma d/f \leq 0.7 \tag{2}$$
$$-3.1 \leq \frac{f}{f_1} + \frac{f}{f_4} \leq -2.5 \tag{3}$$
$$25 \leq \frac{\nu_1 + \nu_3}{2} - \frac{\nu_2 + \nu_4}{2} \leq 30 \tag{4}$$

wherein, f represents a total focal length, $\epsilon d$ represents a length of an optical axis from the frontmost lens surface of the lens system to the rearmost lens surface thereof, TL represents the sum of $\epsilon d$ described above with a lens back focal length positioned an infinite focussing condition, f1 and f4 represent focal lengths of the first and fourth lens components respectively, and $\nu_1$, $\nu_2$, $\nu_3$ and $\nu_4$ represent the Abbe numbers of the first, second, third and fourth lens components respectively.

TL/f of the condition (1) is referred as a telephoto ratio. The conditions (1) and (2) guarantee the compactness of the whole lens system. The condition (3) defines a value of the spherical aberration. If the value of the formula becomes beyond the limits of condition (3), the spherical aberration is so greatly produced as not to be capable of compensation into an adequate value.

The condition (4) is concerned with the longitudinal and lateral aberrations. If the value of formula becomes beyond the limits of condition (4), it becomes difficult to compensate both of the longitudinal and lateral aberrations.

Following Table 1 to 6 disclose, respectively, the first to sixth embodiment of the present invention. In the tables, r is the radius of curvature with respective sub numbers indicating the surfaces from the magnification side (screen side) to the reduction side (film side), d represents the axial distance and includes both the air spaces and the actual thickness of the lenses along the optical axis, N equals the refractive index and the sub numbers refer to the specific lens elements from the magnification side to the reduction side, and $\nu$ equals the Abbe number and again the sub numbers refer to the specific lens elements from the magnification side to the reduction side. The values for coefficients appearing to the formulae of the conditions (1) to (4) are shown at the bottom of respective tables.

TABLE 1

$F_{No.} = 4.0$ $\quad \omega = 15.0°$

| radius of curvature | axial distance | refractive index (Nd) | Abbe number (νd) |
|---|---|---|---|
| $r_1$ ∞ | $d_1$ 0.0 | | |
| $r_2$ 0.208 | $d_2$ 0.070 | $N_1$ 1.51112 | $\nu_1$ 60.49 |
| $r_3$ 1.594 | $d_3$ 0.012 | | |
| $r_4$ −0.970 | $d_4$ 0.117 | $N_2$ 1.76182 | $\nu_2$ 26.55 |
| $r_5$ −1.852 | $d_5$ 0.061 | | |
| $r_6$ 0.897 | $d_6$ 0.070 | $N_3$ 1.61762 | $\nu_3$ 52.70 |
| $r_7$ −0.897 | $d_7$ 0.053 | | |
| $r_8$ −0.158 | $d_8$ 0.028 | $N_4$ 1.75690 | $\nu_4$ 29.69 |
| $r_9$ 2.206 | $d_9$ 0.135 | | |
| $r_{10}$ 1.917 | $d_{10}$ 0.145 | $N_5$ 1.75450 | $\nu_5$ 32.83 |
| $r_{11}$ −0.600 | | | |
| $r_{12}$ ∞ | d 0.075 | $N_6$ 1.51680 | $\nu_6$ 64.12 |
| $r_{13}$ ∞ | | | |

$$\frac{\Sigma d}{f} = 0.691, \quad \frac{TL}{f} = 0.99$$

$$\frac{f}{f_1} + \frac{f}{f_4} = -3.01$$

$$\frac{\nu_1 + \nu_3}{2} - \frac{\nu_2 + \nu_4}{2} = 28.5$$

TABLE 2

$F_{No.} = 4.0$ $\quad \omega = 15.0°$

| radius of curvature | axial distance | refractive index (Nd) | Abbe number (νd) |
|---|---|---|---|
| $r_1$ ∞ | $d_1$ 0.0 | | |
| $r_2$ 0.209 | $d_2$ 0.055 | $N_1$ 1.51680 | $\nu_1$ 64.12 |
| $r_3$ 1.500 | $d_3$ 0.019 | | |
| $r_4$ −1.121 | $d_4$ 0.174 | $N_2$ 1.78472 | $\nu_2$ 25.75 |
| $r_5$ −1.691 | $d_5$ 0.048 | | |
| $r_6$ 0.810 | $d_6$ 0.057 | $N_3$ 1.57135 | $\nu_3$ 52.85 |
| $r_7$ −1.048 | $d_7$ 0.047 | | |
| $r_8$ −0.164 | $d_8$ 0.018 | $N_4$ 1.75450 | $\nu_4$ 32.83 |
| $r_9$ 6.439 | $d_9$ 0.137 | | |
| $r_{10}$ 1.369 | $d_{10}$ 0.128 | $N_5$ 1.75450 | $\nu_5$ 32.83 |
| $r_{11}$ −1.102 | | | |
| $r_{12}$ ∞ | d 0.075 | $N_6$ 1.51680 | $\nu_6$ 64.12 |
| $r_{13}$ ∞ | | | |

$$\frac{\Sigma d}{f} = 0.693, \quad \frac{TL}{f} = 0.97$$

$$\frac{f}{f_1} + \frac{f}{f_4} = -2.58$$

$$\frac{\nu_1 + \nu_3}{2} - \frac{\nu_2 + \nu_4}{2} = 29.2$$

TABLE 3

$F_{No.} = 5.6$ $\quad \omega = 15.0°$

| radius of curvature | axial distance | refractive index (Nd) | Abbe number (νd) |
|---|---|---|---|
| $r_1$ ∞ | $d_1$ 0.0 | | |
| $r_2$ 0.208 | $d_2$ 0.070 | $N_1$ 1.51112 | $\nu_1$ 60.49 |
| $r_3$ 1.631 | $d_3$ 0.012 | | |
| $r_4$ −0.944 | $d_4$ 0.117 | $N_2$ 1.76182 | $\nu_2$ 26.55 |
| $r_5$ −1.888 | $d_5$ 0.061 | | |
| $r_6$ 0.890 | $d_6$ 0.070 | $N_3$ 1.61762 | $\nu_3$ 52.70 |
| $r_7$ −0.890 | $d_7$ 0.053 | | |
| $r_8$ −0.158 | $d_8$ 0.027 | $N_4$ 1.75690 | $\nu_4$ 29.69 |
| $r_9$ 2.233 | $d_9$ 0.134 | | |
| $r_{10}$ 2.014 | $d_{10}$ 0.140 | $N_5$ 1.75450 | $\nu_5$ 32.83 |
| $r_{11}$ −0.586 | | | |
| $r_{12}$ ∞ | d 0.075 | $N_6$ 1.51680 | $\nu_6$ 64.12 |
| $r_{13}$ ∞ | | | |

$$\frac{\Sigma d}{f} = 0.684, \quad \frac{TL}{f} = 1.00$$

TABLE 3-continued $F_{No.} = 5.6$ $\quad \omega = 15.0°$

| radius of curvature | axial distance | refractive index (Nd) | Abbe number (νd) |
|---|---|---|---|

$$\frac{f}{f_1} + \frac{f}{f_4} = -3.00$$

$$\frac{\nu_1 + \nu_3}{2} - \frac{\nu_2 + \nu_4}{2} = 28.5$$

TABLE 4

$F_{No.} = 4.0$ $\quad \omega = 15.0°$

| radius of curvature | axial distance | refractive index (Nd) | Abbe number (νd) |
|---|---|---|---|
| $r_1$ ∞ | $d_1$ 0.0 | | |
| $r_2$ 0.213 | $d_2$ 0.055 | $N_1$ 1.51680 | $\nu_1$ 64.12 |
| $r_3$ 2.424 | $d_3$ 0.033 | | |
| $r_4$ −0.962 | $d_4$ 0.141 | $N_2$ 1.67270 | $\nu_2$ 32.22 |
| $r_5$ −2.117 | $d_5$ 0.080 | | |
| $r_6$ 0.771 | $d_6$ 0.030 | $N_3$ 1.58267 | $\nu_3$ 46.43 |
| $r_7$ −1.052 | $d_7$ 0.036 | | |
| $r_8$ −0.168 | $d_8$ 0.025 | $N_4$ 1.75520 | $\nu_4$ 27.51 |
| $r_9$ 2.192 | $d_9$ 0.136 | | |
| $r_{10}$ 1.105 | $d_{10}$ 0.079 | $N_5$ 1.73300 | $\nu_5$ 28.24 |
| $r_{11}$ | | | |
| $r_{12}$ ∞ | d 0.075 | $N_6$ 1.51680 | $\nu_6$ 64.12 |
| $r_{13}$ ∞ | | | |

$$\frac{\Sigma d}{f} = 0.615, \quad \frac{TL}{f} = 0.93$$

$$\frac{f}{f_1} + \frac{f}{f_4} = -2.62$$

$$\frac{\nu_1 + \nu_3}{2} - \frac{\nu_2 + \nu_4}{2} = 25.4$$

TABLE 5

$F_{No.} = 4.0$ $\quad \omega = 15.0°$

| radius of curvature | axial distance | refractive index (Nd) | Abbe number (νd) |
|---|---|---|---|
| $r_1$ ∞ | $d_1$ 0.0 | | |
| $r_2$ 0.215 | $d_2$ 0.069 | $N_1$ 1.49520 | $\nu_1$ 79.74 |
| $r_3$ 93.103 | $d_3$ 0.019 | | |
| $r_4$ −0.815 | $d_4$ 0.060 | $N_2$ 1.78472 | $\nu_2$ 25.75 |
| $r_5$ −2.992 | $d_5$ 0.108 | | |
| $r_6$ 0.711 | $d_6$ 0.083 | $N_3$ 1.72100 | $\nu_3$ 33.40 |
| $r_7$ −1.295 | $d_7$ 0.047 | | |
| $r_8$ −0.167 | $d_8$ 0.025 | $N_4$ 1.83400 | $\nu_4$ 37.05 |
| $r_9$ 5.144 | $d_9$ 0.138 | | |
| $r_{10}$ 0.978 | $d_{10}$ 0.085 | $N_5$ 1.67339 | $\nu_5$ 29.25 |
| $r_{11}$ −0.969 | | | |
| $r_{12}$ ∞ | d 0.075 | $N_6$ 1.51680 | $\nu_6$ 64.12 |
| $r_{13}$ ∞ | | | |

$$\frac{\Sigma d}{f} = 0.634, \quad \frac{TL}{f} = 0.90$$

$$\frac{f}{f_1} + \frac{f}{f_4} = -2.86$$

$$\frac{\nu_1 + \nu_3}{2} - \frac{\nu_2 + \nu_4}{2} = 25.2$$

TABLE 6

$F_{No.} = 4.0$ $\quad \omega = 15.0°$

| radius of curvature | axial distance | refractive index (Nd) | Abbe number (νd) |
|---|---|---|---|
| $r_1$ 0.215 | $d_1$ 0.070 | $N_1$ 1.49520 | $\nu_1$ 79.74 |
| $r_2$ 28.080 | $d_2$ 0.019 | | |
| $r_3$ −0.811 | $d_3$ 0.062 | $N_2$ 1.78472 | $\nu_2$ 25.75 |
| $r_4$ −3.041 | $d_4$ 0.010 | | |
| $r_5$ ∞ | $d_5$ 0.100 | | |
| $r_6$ 0.698 | $d_6$ 0.086 | $N_3$ 1.72100 | $\nu_3$ 33.40 |

TABLE 6-continued

| | radius of curvature | axial distance | | $F_{No.} = 4.0$ refractive index (Nd) | | $\omega = 15.0°$ Abbe number ($\nu d$) |
|---|---|---|---|---|---|---|
| $r_7$ | −1.255 | $d_7$ | 0.047 | | | |
| $r_8$ | −0.165 | $d_8$ | 0.025 | $N_4$ | 1.83400 | $\nu_4$ 37.05 |
| $r_9$ | 4.584 | $d_9$ | 0.138 | | | |
| $r_{10}$ | 0.978 | $d_{10}$ | 0.085 | $N_5$ | 1.67339 | $\nu_5$ 29.25 |
| $r_{11}$ | −0.874 | | | | | |
| $r_{12}$ | ∞ | $d$ | 0.075 | $N_6$ | 1.51680 | $\nu_6$ 64.12 |
| $r_{13}$ | ∞ | | | | | |

$$\frac{\Sigma d}{f} = 0.642, \quad \frac{TL}{f} = 0.99$$

$$\frac{f}{f_1} + \frac{f}{f_4} = -3.01$$

$$\frac{\nu_1 + \nu_3}{2} - \frac{\nu_2 + \nu_4}{2} = 28.5$$

What is claimed is:

1. A lens system for projecting images of microfilm comprising from the magnification side to the reduction side,
   a first lens component of a positive meniscus lens component convex to the magnification side,
   a second lens component of a negative meniscus lens component concave to the magnification side,
   a third lens component of a biconvex lens component,
   a fourth lens component of a biconcave lens component having a powerful concave surface faced to the magnification side, and
   a fifth lens component of a biconvex lens component, wherein said lens components are respectively spaced from each other on an optical axis.

2. A lens system as claimed in claim 1 further fulfilling following conditions:

$$0.9 \leq TL/f \leq 1.1$$

$$0.6 \leq \epsilon d/f \leq 0.7$$

wherein,
   f represents a total focal length, $\epsilon d$ represents a length of an optical axis from the frontmost lens surface to the rearmost lens surface of the lens system, and TL represents the sum of $\epsilon d$ described above with a lens back focal length at an infinite focussing condition.

3. A lens system as claimed in claim 1 further fulfilling following conditions:

$$-3.1 \leq \frac{f}{f_1} + \frac{f}{f_4} \leq -2.5$$

$$25 \leq \frac{\nu_1 + \nu_3}{2} - \frac{\nu_2 + \nu_4}{2} \leq 30$$

wherein,
   f represents a total focal length, $f_1$ and $f_4$ represent focal lengths of first and fourth lens components respectively, and $\nu_1$, $\nu_2$, $\nu_3$ and $\nu_4$ represent the Abbe numbers of the first through fourth lens components respectively.

4. A lens system as claimed in claim 1 further comprising an aperture stop positioned at a position on the forward side of the third lens component.

5. A lens system as claimed in claim 1 further comprising an aperture stop positioned at the frontmost side of the lens system.

6. A lens system for projecting images of microfilm comprising from the magnification side to the reduction side,
   a first lens component of a positive meniscus lens component convex to the magnification side,
   a second lens component of a negative meniscus lens component concave to the magnification side,
   a third lens component of a biconvex lens component,
   a fourth lens component of a biconcave lens element having a powerful concave surface faced to the magnification side, and
   a fifth lens component of a biconvex lens component, wherein the lens system fulfills following conditions:

$$0.9 \leq TL/f \leq 1.1$$

$$0.6 \leq \epsilon d/f \leq 0.7$$

wherein f represents a total focal length, $\epsilon d$ represents a length of an optical axis from the frontmost lens surface to the rearmost lens surface of the lens system, and TL represents the sum of $\epsilon d$ described above with a lens back focal length at an infinite focussing condition.

7. A lens system as claimed in claim 6 further fulfilling following conditions:

$$-3.1 \leq \frac{f}{f_1} + \frac{f}{f_4} \leq -2.5$$

$$25 \leq \frac{\nu_1 + \nu_3}{2} - \frac{\nu_2 + \nu_4}{2} \leq 30$$

wherein,
   $f_1$ and $f_4$ represent focal lengths of first and fourth lens components respectively, and $\nu_1$, $\nu_2$, $\nu_3$ and $\nu_4$ represent the Abbe numbers of the first through fourth lens components respectively.

8. A lens system as claimed in claim 6 further comprising an aperture stop positioned at a position on the forward side of the third lens component.

9. A lens system as claimed in claim 6, further comprising an aperture stop positioned at the frontmost side of the lens system.

10. A lens system for projecting images of microfilm comprising from the magnification side to the reduction side:
   a first lens component of a positive meniscus lens component convex to the magnification side;
   a second lens component of a negative meniscus lens component concave to the magnification side;
   a third lens component of a biconvex lens component;
   a fourth lens component of a biconcave lens element having a powerful concave surface faced to the magnification side, and
   a fifth lens component of a biconvex lens component;
   wherein the lens system fulfills the following conditions:

$$-3.1 \leq \frac{f}{f_1} + \frac{f}{f_4} \leq -2.5$$

$$25 \leq \frac{\nu_1 + \nu_3}{2} - \frac{\nu_2 + \nu_4}{2} \leq 30$$

wherein, f represents a total focal length, $f_1$ and $f_4$ represent focal lengths of first and fourth lens components, respectively, and $\nu_1$, $\nu_2$, $\nu_3$ and $\nu_4$ represent the Abbe numbers of the first through fourth lens components, respectively.

11. A lens system as claimed in claim 10 further comprising an aperture stop positioned at a position on the forward side of the third lens component.

12. A lens system as claimed in claim 10 further comprising an aperture stop positioned at the frontmost side of the lens system.

13. A lens system for projecting images of microfilm consisting of from the magnification side to the reduction side:
  a first lens component of a positive meniscus lens component convex to the magnification side;
  a second lens component of a negative meniscus lens component concave to the magnification side;
  a third lens component of a biconvex lens component;
  a fourth lens component of a biconcave lens component having a powerful concave surface faced to the magnification side, and
  a fifth lens component of a biconvex lens component.

14. A lens system as claimed in claim 13 further fulfilling the following conditions:

$$0.9 \leq TL/f \leq 1.1$$

$$0.6 \leq \epsilon d/f \leq 0.7$$

wherein,
  f represents a total focal length, $\epsilon d$ represents a length of an optical axis from the frontmost lens surface to the rearmost lens surface of the lens system, and TL represents the sum of $\epsilon d$ described above and a lens positioned at an infinite focusing condition.

15. A lens system as claimed in claim 13 further fulfilling the following conditions:

$$-3.1 \leq \frac{f}{f_1} + \frac{f}{f_4} \leq -2.5$$

$$25 \leq \frac{\nu_1 + \nu_3}{2} - \frac{\nu_2 + \nu_4}{2} \leq 30$$

wherein,
  f represents a total focal length, $f_1$ and $f_4$ represent focal lengths of first and fourth lens components, respectively, and $\nu_1$, $\nu_2$, $\nu_3$ and $\nu_4$ represent the Abbe numbers of the first through fourth lens components, respectively.

16. A lens system as claimed in claim 13 further comprising an aperture stop positioned at a position on the forward side of the third lens component.

17. A lens system as claimed in claim 13 further comprising an aperture stop position at the frontmost side of the lens system.

* * * * *

UNITED STATES PATENT OFFICE
CERTIFICATE OF CORRECTION

Patent No. 4,790,638                Dated December 13, 1988

Inventor(s) Satoshi Iwasaki, Toshihiko Ueda, & Kunihiko Konoma

It is certified that error appears in the above-identified patent and that said Letters Patent is hereby corrected as shown below:

Column 2, line 14, delete "$\varepsilon d$" and insert --$\Sigma d$--.

Column 2, line 18, delete "$\varepsilon d$" and insert --$\Sigma d$--.

Column 2, line 21, delete "$\varepsilon d$" and insert --$\Sigma d$--.

Column 4, line 37, delete "$\varepsilon d$" and insert --$\Sigma d$--.

Column 7, line 41, delete "$\varepsilon d$" and insert --$\Sigma d$--.

Column 7, line 44, delete "$\varepsilon d$" and insert --$\Sigma d$--.

Column 7, line 47, delets "$\varepsilon d$" and insert --$\Sigma d$--.

UNITED STATES PATENT OFFICE
CERTIFICATE OF CORRECTION

Patent No. 4,790,638                    Dated  December 13, 1988

Inventor(s) Satoshi Iwasaki, Toshihiko Ueda, & Kunihiko Konoma

It is certified that error appears in the above-identified patent and that said Letters Patent is hereby corrected as shown below:

Column 8, line 21, delete "$\varepsilon d$" and insert --$\Sigma d$--.

Column 8, line 23, delete "$\varepsilon d$" and insert --$\Sigma d$--.

Column 8, line 26, delete "$\varepsilon d$" and insert --$\Sigma d$--.

Column 9, line 29, delete "$\varepsilon d$" and insert --$\Sigma d$--.

Column 10, line 2, delete "$\varepsilon d$" and insert --$\Sigma d$--.

Column 10, line 5, delete "$\varepsilon d$" and insert --$\Sigma d$--.

Signed and Sealed this

Twenty-fifth Day of July, 1989

Attest:

DONALD J. QUIGG

Attesting Officer          Commissioner of Patents and Trademarks